US 12,094,650 B2

(12) United States Patent
Stautner et al.

(10) Patent No.: US 12,094,650 B2
(45) Date of Patent: Sep. 17, 2024

(54) SUPERCONDUCTING MAGNET APPARATUS AND METHOD OF OPERATING SAME

(71) Applicant: General Electric Company, Schenectady, NY (US)

(72) Inventors: Ernst Wolfgang Stautner, Niskayuna, NY (US); James William Bray, Niskayuna, NY (US); Minfeng Xu, Niskayuna, NY (US); Anbo Wu, Niskayuna, NY (US); Michael Parizh, Niskayuna, NY (US)

(73) Assignee: General Electric Renovables España, S.L., Barcelona (ES)

( * ) Notice: Subject to any disclaimer, the term of this patent is extended or adjusted under 35 U.S.C. 154(b) by 972 days.

(21) Appl. No.: 17/045,533

(22) PCT Filed: Apr. 6, 2018

(86) PCT No.: PCT/US2018/026400
§ 371 (c)(1),
(2) Date: Oct. 6, 2020

(87) PCT Pub. No.: WO2019/194815
PCT Pub. Date: Oct. 10, 2019

(65) Prior Publication Data
US 2021/0159003 A1 May 27, 2021

(51) Int. Cl.
*H01F 6/06* (2006.01)
*F03D 7/02* (2006.01)
(Continued)

(52) U.S. Cl.
CPC ............. *H01F 6/04* (2013.01); *F03D 7/02* (2013.01); *F03D 13/20* (2016.05); *H01F 6/008* (2013.01);
(Continued)

(58) Field of Classification Search
CPC ............................................. H01F 6/00–6/065
See application file for complete search history.

(56) References Cited

U.S. PATENT DOCUMENTS

| 4,544,979 A | 10/1985 | Ennis, Jr. et al. |
| 4,635,450 A | 1/1987 | Laskaris |

(Continued)

FOREIGN PATENT DOCUMENTS

| EP | 1601029 A1 | 11/2005 | |
| JP | 58061608 A | * 4/1983 | ............... H01F 6/00 |

(Continued)

OTHER PUBLICATIONS

PCT International Search Report and Written Opinion—PCT/US2018/026400 on Jan. 20, 2019.

(Continued)

*Primary Examiner* — Ramon M Barrera
(74) *Attorney, Agent, or Firm* — Dority & Manning, P.A.

(57) ABSTRACT

A superconducting magnet apparatus includes a plurality of superconducting magnet coil sections connected in series and housed within a cryogenically cooled, vacuum container. A power source generates a current. A first lead is electrically connected to the superconducting magnet coil sections. A second lead is enclosed entirely within the vacuum container. The second lead has a first section and a second section, and the first section is electrically connected to the power source. The second section is electrically connected to the first lead, and rigidly connected to a linear displacement device enclosed entirely within the vacuum container. The linear displacement device linearly displaces the second section relative to the first section, so that the first section contacts the second section thereby electrically connecting the first and second sections, or by creating a gap between the first section and second section thereby elec- (Continued)

trically disconnecting the first section from the second section.

12 Claims, 8 Drawing Sheets

(51) Int. Cl.
  *F03D 13/20* (2016.01)
  *H01F 6/00* (2006.01)
  *H01F 6/02* (2006.01)
  *H01F 6/04* (2006.01)
  *H01H 1/14* (2006.01)
  *H02K 7/18* (2006.01)
  *H02K 9/22* (2006.01)
  *F03D 9/25* (2016.01)
  *H01H 3/24* (2006.01)

(52) U.S. Cl.
  CPC ............... *H01F 6/02* (2013.01); *H01H 1/14* (2013.01); *H02K 7/1838* (2013.01); *H02K 9/225* (2021.01); *F03D 9/25* (2016.05); *F05B 2240/21* (2013.01); *F05B 2240/912* (2013.01); *H01H 3/24* (2013.01); *Y02E 40/60* (2013.01)

(56) References Cited

U.S. PATENT DOCUMENTS

| | | | |
|---|---|---|---|
| 4,813,244 A | 3/1989 | Brzozowski | |
| 4,841,268 A | 6/1989 | Burnett et al. | |
| 5,032,748 A | 7/1991 | Sakuraba et al. | |
| 5,317,296 A | 5/1994 | Vermilyea et al. | |
| 7,132,914 B2 | 11/2006 | Nemoto et al. | |
| 7,323,963 B2 * | 1/2008 | Nemoto | G01R 33/3815 62/51.1 |
| 7,724,483 B2 | 5/2010 | Bray et al. | |
| 7,821,164 B2 | 10/2010 | Laskaris et al. | |
| 9,182,464 B2 | 11/2015 | Mine et al. | |
| 9,874,618 B2 | 1/2018 | Lvovsky et al. | |
| 2004/0239462 A1 | 12/2004 | Nemoto et al. | |
| 2013/0088313 A1 | 4/2013 | Harrison | |
| 2014/0185165 A1 | 7/2014 | Rajput-Ghoshal et al. | |
| 2015/0255977 A1 | 9/2015 | Jonas et al. | |

FOREIGN PATENT DOCUMENTS

| | | | | |
|---|---|---|---|---|
| JP | H05291036 A | 11/1993 | | |
| WO | WO-2016106037 A1 * | 6/2016 | ............ | G01R 33/288 |

OTHER PUBLICATIONS

Abrahamsen et al., Superconducting Wind Turbine Generators, Superconductor Science and Technology, vol. 23, Issue 3, Feb. 2010, pp. 1-8.
Fair et al., Superconductivity for Large Scale Wind Turbines DE-EE0005143, 2012, 78 Pages.
Iwasa, Case Studies in Superconducting Magnets, Design and Operational Issues, Springer Science & Business Media, 1994. Abstract Only.
Iwasa, Towards Liquid-helium-free, Persistent-mode $MgB_2$ MRI Magnets: FBML Experience, Superconductor Science and Technology, vol. 30, 2017, 14 Pages.
Kusada et al., Persistent Current HTS Magnet Cooled by Cryocooler (2)—Magnet Configuration and Persistent Current Operation Test, IEEE Transactions on Applied Superconductivity, vol. 15, No. 2, Jun. 2005, pp. 2285-2288.
Whitestone et al., Persistent Mode Superconducting Magnet with Demountable Leads, Advances in Cryogenic Engineering, vol. 39, 1994, pp. 317-323.

* cited by examiner

SUPERCONDUCTING MAGNET APPARATUS AND METHOD OF OPERATING SAME

BACKGROUND OF THE INVENTION

The aspects described herein relate generally to superconducting magnet systems, and more particularly, to an apparatus and method for controlling operation of superconducting magnet systems.

Some electrical machines, such as generators or motors, have a rotating rotor and a stationary stator. The current density and thus the specific power and efficiency of these machines can be increased by using superconducting coils that require maintaining them at superconducting temperatures. The superconducting coils are surrounded by a cryogenic cooling circuit that houses a coolant with a temperature maintained by cryocoolers. The use of superconducting coils in some electrical machines can result in an increase in electromagnetic forces generated by the coils and an increase in flux densities within the machines.

Superconducting coils have zero electrical resistance. However, superconducting coils may undergo a transition from a superconducting state to a normal, conductive state due to mechanical disturbance, an abrupt change in the magnetic field, a temperature anomaly or other reasons. This transition of the superconductive state is known as quenching. More particularly, quenching is an abnormal termination of magnet operation that can occur when a superconducting coil enters a normal (resistive) state. Sometimes quench can occur when the magnetic field within the magnet is too large and/or the rate of change of the magnetic field is too large which can result in eddy currents and increased heating to raise the temperature of the coils and surrounding regions. The increased temperature of one coil may increase the temperature of adjacent coils leading to a chain heating reaction such that the whole magnet system becomes resistive, assuring relatively even distribution of the magnetic energy released, acceptable temperature and voltage rise.

BRIEF DESCRIPTION OF THE INVENTION

In an aspect of the present disclosure, a superconducting magnet apparatus includes a plurality of superconducting magnet coil sections connected in series and housed within a cryogenically cooled, vacuum container. A power source is configured to generate a current. A first lead is electrically connected to the plurality of superconducting magnet coil sections. A second lead is enclosed entirely within the vacuum container. The second lead has a first section and a second section, and the first section is electrically connected to the power source. The second section is electrically connected to the first lead, and the second section is rigidly connected to a linear displacement device enclosed entirely within the vacuum container. The linear displacement device is configured to linearly displace the second section relative to the first section, so that the first section contacts the second section thereby electrically connecting the first section and the second section, or by creating a gap between the first section and the second section thereby electrically disconnecting the first section from the second section.

In another aspect of the present disclosure, a wind turbine includes a tower, a nacelle coupled to the tower, and a rotor comprising one or more blades. The rotor is coupled to the nacelle. A superconducting magnet apparatus is housed within the nacelle. The superconducting magnet apparatus includes a plurality of superconducting magnet coil sections connected in series and housed within a cryogenically cooled, vacuum container. A power source is configured to generate a current. A first lead is electrically connected to the plurality of superconducting magnet coil sections. A second lead is enclosed entirely within the vacuum container, and the second lead has a first section and a second section. The first section is electrically connected to the power source. The second section is electrically connected to the first lead, and the second section is rigidly connected to a linear displacement device enclosed entirely within the vacuum container. The linear displacement device is configured to linearly displace the second section relative to the first section, so that the first section contacts the second section thereby electrically connecting the first section and the second section, or by creating a gap between the first section and the second section thereby electrically disconnecting the first section from the second section.

In yet another aspect of the present disclosure, a method of operating a wind turbine is provided. The wind turbine includes a tower, a nacelle coupled to the tower, and a rotor having one or more blades. The rotor is coupled to the nacelle. A superconducting magnet apparatus is housed within the nacelle. The superconducting magnet apparatus includes a plurality of superconducting magnet coil sections connected in series and housed within a cryogenically cooled, vacuum container. The method includes remotely controlling the superconducting magnet apparatus to function in multiple modes. The multiple modes are at least one of a ramp-up mode to charge the superconducting magnet coil sections, a persistent mode that allows the charge or current to circulate through the superconducting magnet coil sections, and a ramp-down mode to discharge the superconducting magnet coil sections. The remotely controlling step is performed by a remotely located control center that communicates to a superconducting magnet control system in the wind turbine via a wired or wireless communication link.

DETAILED DESCRIPTION OF THE INVENTION

One or more specific aspects of the present disclosure will be described below. In an effort to provide a concise description of these aspects, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related objectives and constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various aspects of the present disclosure, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one aspect" or "an aspect" of the present disclosure are not intended to be interpreted as excluding the existence of additional aspects that also incorporate the recited features.

Figure 1:
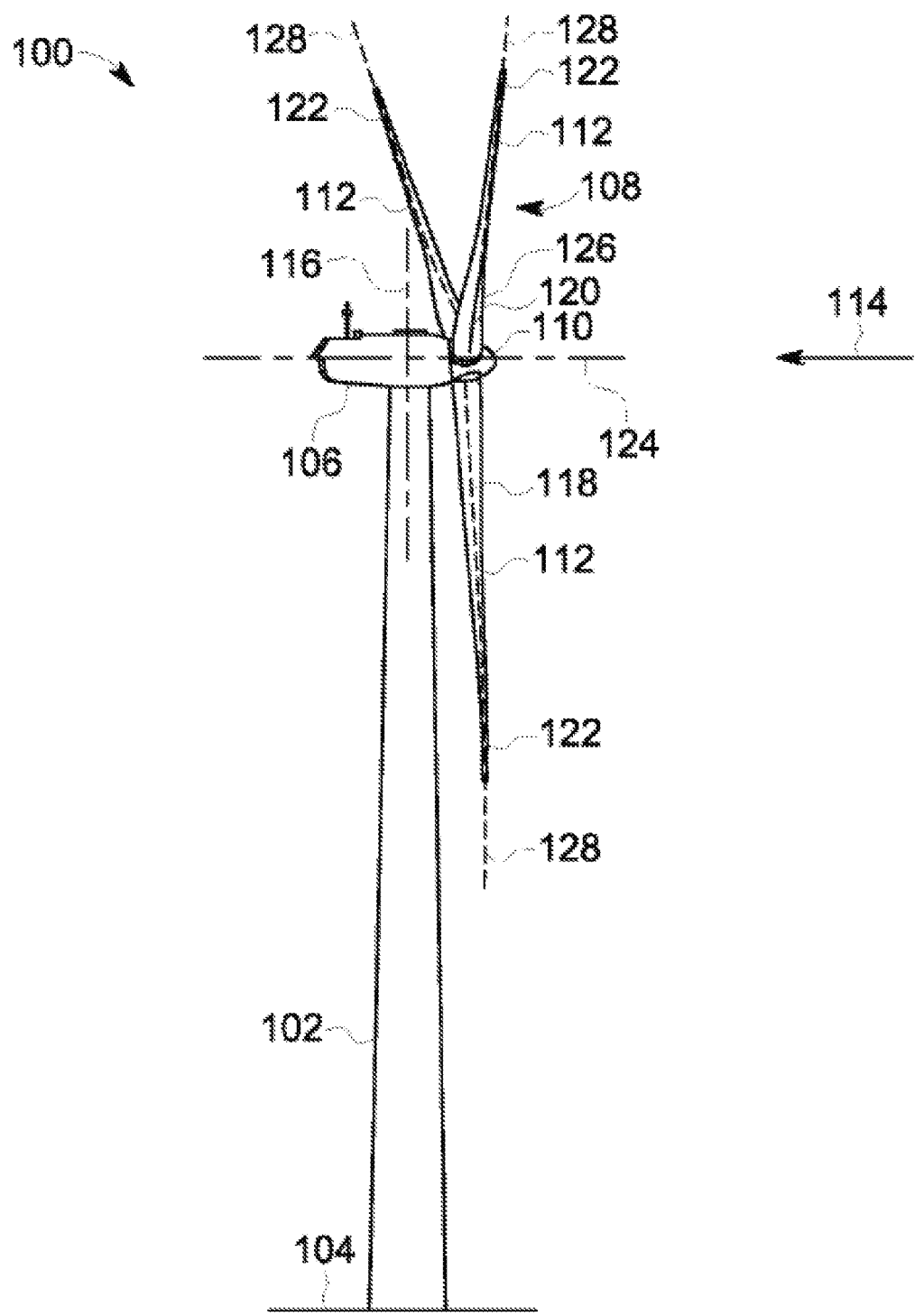
FIG. 1 is perspective view of an exemplary wind turbine.

FIG. 1 is a schematic view of an exemplary wind turbine 100. In the exemplary aspect, wind turbine 100 is a horizontal-axis wind turbine, with the inclination of the generator axis to the horizontal level is typically within 10 degrees or less. Alternatively, wind turbine 100 may be a vertical-axis wind turbine. Wind turbine 100 includes a tower 102 extending from and coupled to a supporting surface 104. Tower 102 may be coupled to surface 104 with anchor bolts or via a foundation mounting piece (neither shown), or surface 104 may be an offshore platform for supporting wind turbine 100, for example. A nacelle 106 is coupled to tower 102, and a rotor 108 is coupled to nacelle 106. Rotor 108 includes a rotatable hub 110 and a plurality of rotor blades 112 coupled to hub 110. In the exemplary aspect, rotor 108 includes three rotor blades 112. Alternatively, rotor 108 may have one or more, or any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate the rotation of rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (not shown). Loads induced to rotor blades 112 are transferred to hub 110 via load transfer regions 120. Each rotor blade 112 also includes a rotor blade tip portion 122.

In one exemplary aspect, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
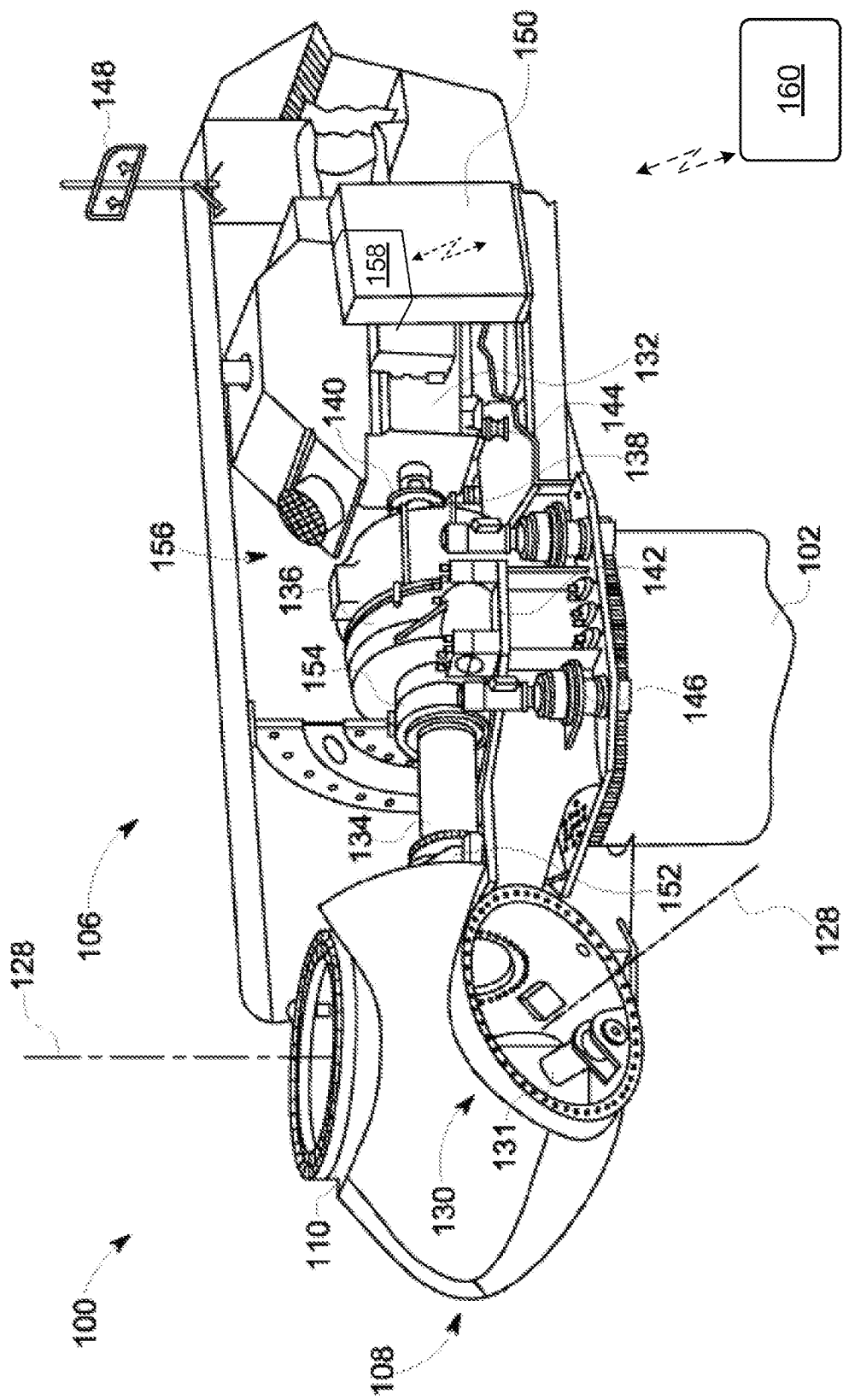
FIG. 2 is a cut-away view of a superconducting generator housed in a nacelle and coupled to a hub of the wind turbine shown in FIG. 1.

FIG. 2 is a partial sectional view of nacelle 106 used with wind turbine 100. In the exemplary aspect, various components of wind turbine 100 are housed in nacelle 106. For example, in the exemplary aspect, nacelle 106 includes pitch assemblies 130. Each pitch assembly 130 is coupled to an associated rotor blade 112 (shown in FIG. 1), and modulates a pitch of an associated rotor blade 112 about pitch axis 128. In the exemplary embodiment, each pitch assembly 130 includes at least one pitch drive motor 131.

Moreover, in the exemplary embodiment, rotor 108 is rotatably coupled to an electrical (or dynamoelectric) machine 132, for example a superconducting generator, positioned within nacelle 106 via a rotor shaft 134 (sometimes referred to as either a main shaft or a low speed shaft), a gearbox 136, a high-speed shaft 138, and a coupling 140. Rotation of rotor shaft 134 rotatably drives gearbox 136 that subsequently drives high speed shaft 138. High speed shaft 138 rotatably drives superconducting generator 132 via coupling 140 and rotation of high speed shaft 138 facilitates production of electrical power by superconducting generator 132. Gearbox 136 is supported by a support 142 and superconducting generator 132 is supported by a support 144. In the exemplary embodiment, gearbox 136 uses a dual path geometry to drive high speed shaft 138. Alternatively, rotor shaft 134 may be coupled directly to superconducting generator 132 via coupling 140 (i.e., without using a gearbox).

Nacelle 106 also includes a yaw drive mechanism 146 that rotates nacelle 106 and rotor 108 about yaw axis 116 to control the perspective of rotor blades 112 with respect to the direction of wind 114. Nacelle 106 also includes at least one meteorological mast 148 that in one embodiment includes a wind vane and anemometer (not shown). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or superconducting generator 132. Nacelle 106 may include any number of support bearings that enable wind turbine 100 to function as disclosed herein. Rotor shaft 134, superconducting generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

The turbine control system 150 may also include or be operatively connected to a superconducting magnet control system 158. The superconducting magnet control system 158 controls various operational modes of the superconducting generator 132 via processors, sensors, switches, and heaters. The superconducting magnet control system 158 may be remotely monitored and controlled (e.g., by remote monitoring center 160) to allow remote sensing of the operational parameters of superconducting generator 132, and to switch between the various operational modes thereof, such as cool-down mode, ramp-up mode, persistent mode and ramp down mode. During ramp-up mode, a power source is connected to the coils of the superconducting magnet for a period of time to ramp the current up through the coils. During persistent mode the power source is disconnected from the coils, and the lack of electrical resistance in the coils enables current to continue to flow therethrough after the power source has been disconnected from the coils. This constant current flow through the superconducting magnet without noticeable decay is known as a "persistent" mode of operation, and is also broadly used in medical and analytical applications such as MRI and NMR systems. During the ramp-down mode, an externally located load resistor may be connected to the coils of the superconducting magnet for a period of time to ramp the current down through the coils to expedite the ramp down process. The ramp-down mode enables the energy (and potential heat) in the superconducting coils to be dispersed external to the vacuum cooled, cryo-container, so that the time of further cool down of the system and return to the operating mode is significantly reduced.

Figure 3:
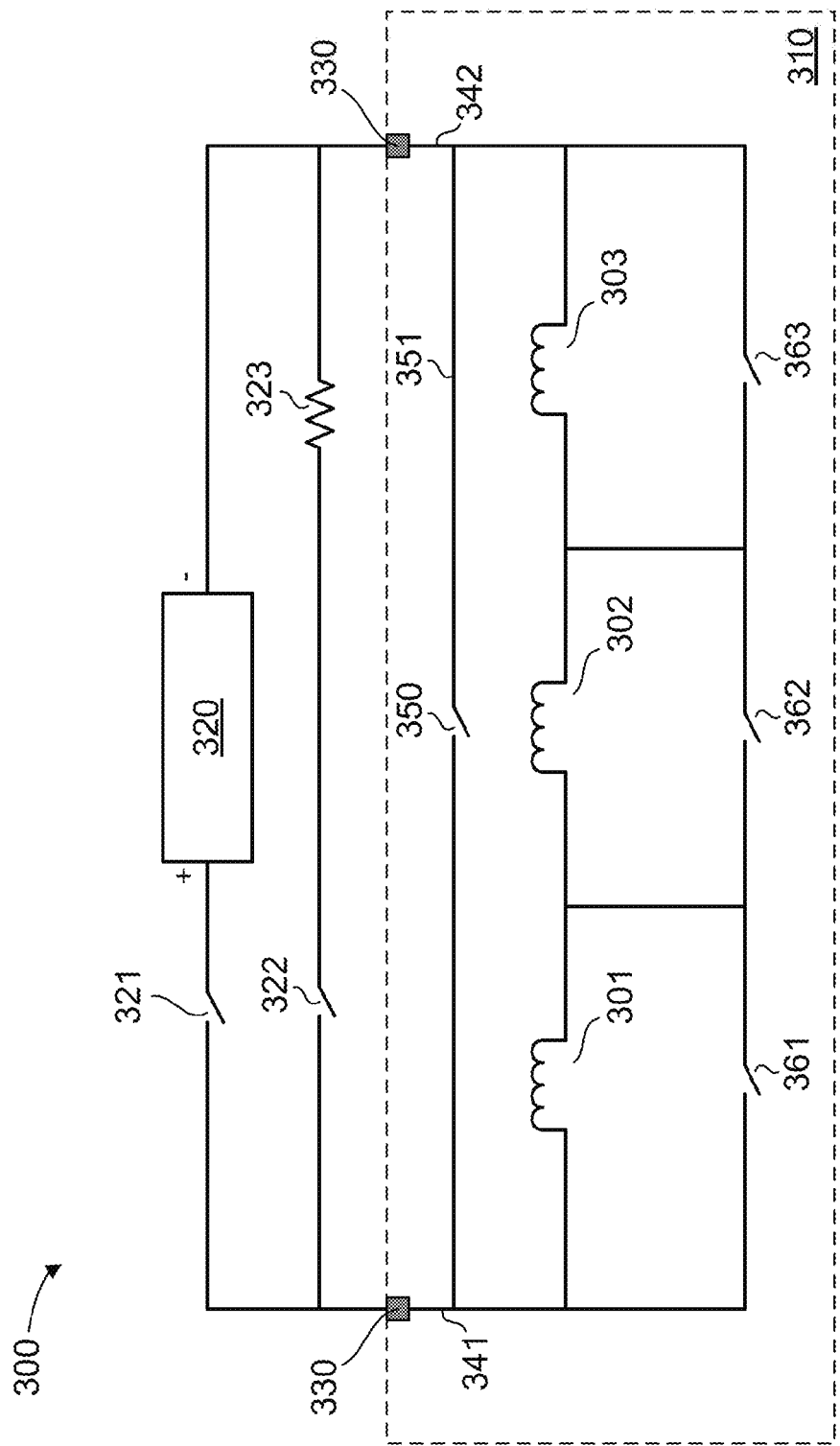
FIG. 3 illustrates a schematic diagram of a superconducting magnet apparatus, according to an aspect of the disclosure.

FIG. 3 illustrates a schematic diagram of a superconducting magnet apparatus 300, according to an aspect of the disclosure. The superconducting magnet apparatus 300 includes a plurality of superconducting magnet coils 301, 302, 303 connected in series and housed within a cryogenically cooled, vacuum container 310. It is to be understood that any of the coils 301, 302 or 303 may be either single coils, or electrically-connected sets of coils. The superconducting magnet coils 301, 302, 303 are energized to form a coil series circuit capable of providing a magnetic field in the cryogenically cooled, vacuum container 310, and this magnetic field may be used in a magnetic resonance imaging machine, or e.g. in a superconducting generator as the armature. The cryogenic circuit for cooling the superconducting coils within the vacuum container 310 is filled with a cryogen (e.g., liquid helium, liquid nitrogen, etc.) The cryogenically cooled coils of the apparatus 300 are configured as a superconducting magnet apparatus.

A power source 320 is configured to generate a current and the power source 320 is selectively connected to (and disconnected from) high-current leads 341 and 342 via switch 330. An optional switch 321 may be used to isolate the power supply 320 from the other circuit elements in superconducting magnet apparatus. Switch 322 may be closed to connect an externally located (relative to cryogenically cooled, vacuum container 310) dump resistor 323 to the superconducting magnet coils 301, 302, 303.

One concern in superconducting magnet assemblies is the discontinuance, or "quenching", of the superconducting operation, which produces undesirable voltages and temperatures within the superconducting magnet apparatus. A quench event occurs when an energy disturbance, such as from magnet coil frictional movement, heats a section of superconducting wire and raises the temperature of the superconducting wire above the critical level where the wire loses its superconducting state. The heated section of the wire becomes resistive, and the heating further raises the temperature of the section of wire and propagates to adjacent areas, thereby increasing the size of the normal section. Irreversible quench then occurs, wherein the electromagnetic energy of the magnet must either be quickly dumped or converted into thermal energy.

Sudden quenching of superconducting operation can cause sharp temperature rises, which can in turn damage components of the superconducting unit unless proper quench protection means are implemented. Such a quench also leads to downtime in the use of the superconducting magnet apparatus 300, as the superconducting magnet must be given time to re-cool and re-ramp after quench. Therefore, it is advantageous to connect the dump resistor 323 to the coils 301-303 if a quench situation occurs or if a quench is predicted, as the potential heat in the circulating current in coils 301-303 may be removed via externally located dump resistor 323 thereby avoiding damage to the superconducting magnet apparatus 300.

When the coils 301, 302, 303 are ramped up to desired operating voltage and current levels, the switch 350 may be closed and the switch 330 opened (thereby disconnected power supply 320 from coils 301-303). A current loop is then formed between coils 301-303 and conductor 351, and this is exemplary of the present mode of operation. Alternatively, switches 361, 362 and 363 may be selectively closed and opened to form multiple persistent circuits.

The independent persistent circuits may use only a single pair of charging leads. In this case, each circuit that includes one or more electrically-connected superconducting coils shall be equipped by a separate persistent current switch. If, for example, the switch 361 is open while switches 362 and 363 are closed, only coil 301 is energized. This procedure allows ramping different currents in separate series-connected circuits, for example, for adjusting currents in the superconducting coils or for testing purposes. Moreover, this coil arrangement may be used for either a complete bypass of current, or for partial load of coils that cannot reach the rated field due to either internal damage of a coil, or its poor performance due to, for example, poor sections of conductor. In this arrangement, the generator may continue its operation although at a somewhat lower power.

Figure 4:
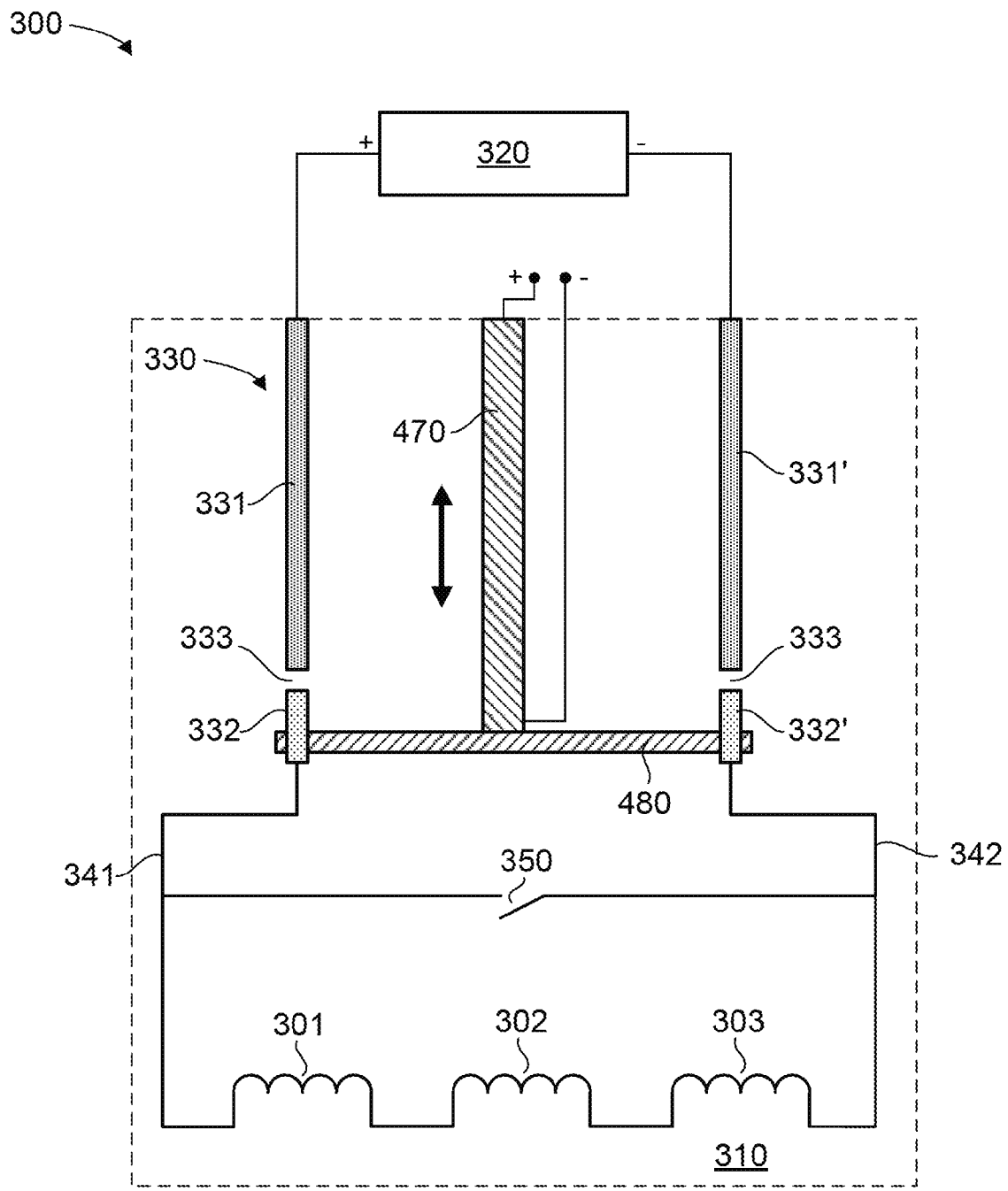
FIG. 4 illustrates a schematic diagram of the superconducting magnet apparatus where the linear displacement device is mounted to the vacuum container, according to an aspect of the disclosure.

FIG. 4 illustrates a schematic diagram of a superconducting magnet apparatus 300 where the linear displacement device 470 is mounted to the vacuum container 310, according to an aspect of the disclosure. The linear displacement device 470 may be mounted to an inside surface of the container 310 or to a rigid support structure attached to the interior of container 310. The switch 330 includes a first lead 341, 342 electrically connected to the superconducting magnet coils 301, 302, 303. The first lead includes a positive lead 341 and a negative lead 342, and both are enclosed entirely within the vacuum container 310. A second lead 331, 332 is enclosed entirely within the vacuum container 310, and the second lead has a first section 331 and a second section 332. The first section 331 is a positive lead and the first section 331' is the negative lead. The first section 331 and 331' is electrically connected to the power source 320 (e.g., by electrically conducting wires or cables). The second section 332, 332' is electrically connected to the first lead 341, 342, respectively. The second section 332 is a positive lead and the second section 332' is the negative lead. The second section 332, 332' is rigidly connected to a linear displacement device 470 enclosed entirely within the vacuum container 310. An advantage to completely enclosing the lead sections 331, 332 in container 310 is that the potential for ice formation on the leads is eliminated. In the past, externally located leads are exposed to warmer air (as compared to inside container 310) and extend out of the vacuum container, and these sections routinely suffered from ice accumulation during ramping operations. When one end of the lead became locked in ice, it required manual intervention to free the stuck lead. This is especially problematic for remotely located machines.

The linear displacement device 470 is configured to linearly displace the second section 332, 332' relative to the first section 331, 331', so that the first section 331, 331' contacts the second section 332, 332' thereby electrically connecting the first section 331, 331' and the second section 332, 332', or by creating a gap 333 between the first section 331, 331' and the second section 332, 332' thereby electrically disconnecting the first section 331, 331' from the second section 332, 332'. The linear displacement device 470 is a piezoelectric linear displacement device or a pneumatic linear displacement device. In a piezoelectric device an applied voltage will change the length of the piezoelectric device. For example, in a piezoelectric linear displacement device the device may have an uncharged state where leads 331 are separated and disconnected from leads 332, and a charged state where leads 331 physically (and electrically) contact leads 332, or vice-versa. The piezoelectric and pneumatic type of linear displacement devices operate satisfactorily in a high magnetic field and cryogenically cooled environment, such as will be experienced in container 310, as they function without outgassing and at temperatures around 50 K. Therefore, piezoelectric or pneumatic linear displacement devices are well suited to selectively connect or disconnect leads 331 and 332.

The second section 332, 332' is rigidly connected to the linear displacement device 470 by an electrically insulating, rigid member 480 having thermal resistance. The member 480 may be formed of a fiberglass material, fiberglass composite, machinable glass-ceramic or other rigid material that is electrically insulating. One example of a machinable glass ceramic is a fluorphlogopite mica in a borosilicate glass matrix, having a composition of roughly: 46% silica (SiO2), 17% magnesium oxide (MgO), 16% aluminium oxide (Al2O3), 10% potassium oxide (K2O), 7% boron trioxide (B2O3), and 4% fluorine. The rigid nature of member 480 enables any movement in linear displacement device 470 to be directly translated to leads 332 and 332'. For example and as shown in FIG. 4, if the linear displacement device shortens in length then leads 332, 332' will move closer to leads 331, 331', respectively. When leads 331 contact leads 332 a circuit will be completed between the coils 301-303 and the power supply 320.

A ramp-up mode occurs when the plurality of superconducting magnet coil sections 301-303 are electrically connected to the power source 320, and this is enabled when the first section 331, 331' contacts the second section 332, 332'. Switch 350 will be opened and current will circulate through power supply 320 and coils 301-303. A persistent mode occurs after ramp-up, and when power supply 320 is disconnected (by forming the gap 333 between lead sections 331 and 332 and by closing switch 350). A ramp-down mode occurs when switch 350 is opened, switches 330 and 322 are closed and dump resistor is placed in series with coils 301-303. The current circulating in the coils 301-303 will be dissipated by the electrical resistance of (and heat generated by) dump resistor 323, without adversely affecting the cryo-cooled, vacuum container 310, cooling system or coils contained therein. All the switches and voltage applied to linear displacement device 470 may be controlled by superconducting magnet control system 158 and/or turbine control system 150.

Figure 5:
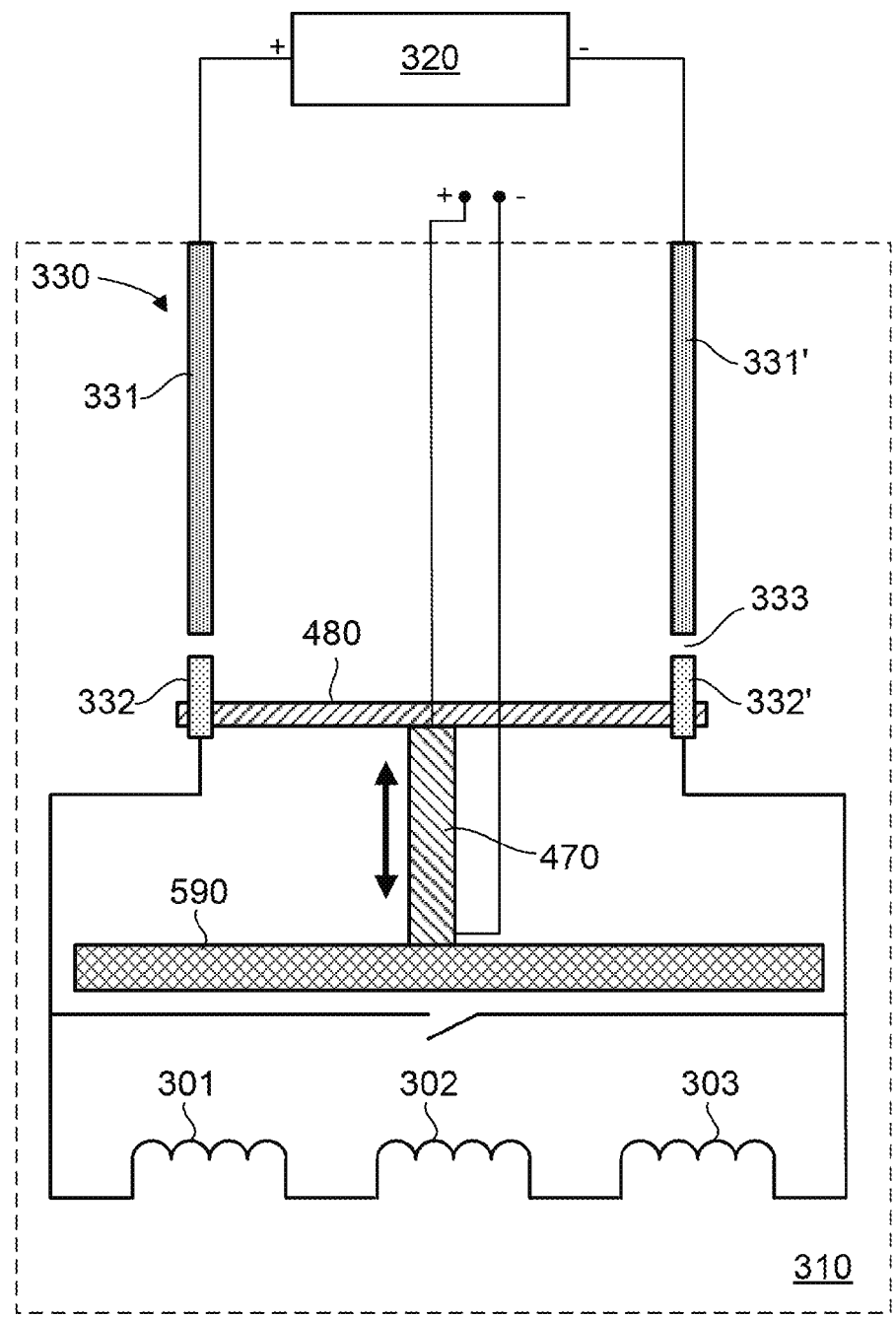
FIG. 5 illustrates a schematic diagram of the superconducting magnet apparatus where the linear displacement device is mounted to a thermal shield enclosed within the vacuum container, according to an aspect of the disclosure.

FIG. 5 illustrates a schematic diagram of a superconducting magnet apparatus 300 where the linear displacement device 470 is mounted to a thermal shield 590 enclosed within the vacuum container 310, according to an aspect of the disclosure. The thermal shield 590 is a thermally insulating member that substantially surrounds the coils 301, 302, 303, and helps to keep any heat generated radially outward of the coils away from coils 301-303. In addition, the thermal shield 590 also helps to maintain the cold temperature in the area immediately surrounding the coils 301-303, switches 350, 361, 362, 363 and any associated conductors. The linear displacement device 470 operates similarly to that which is shown in FIG. 4, except that to make contact between lead portions 331 and 332 the linear displacement device extends in length, and then reduces in length to form gap 333.

Figure 6:
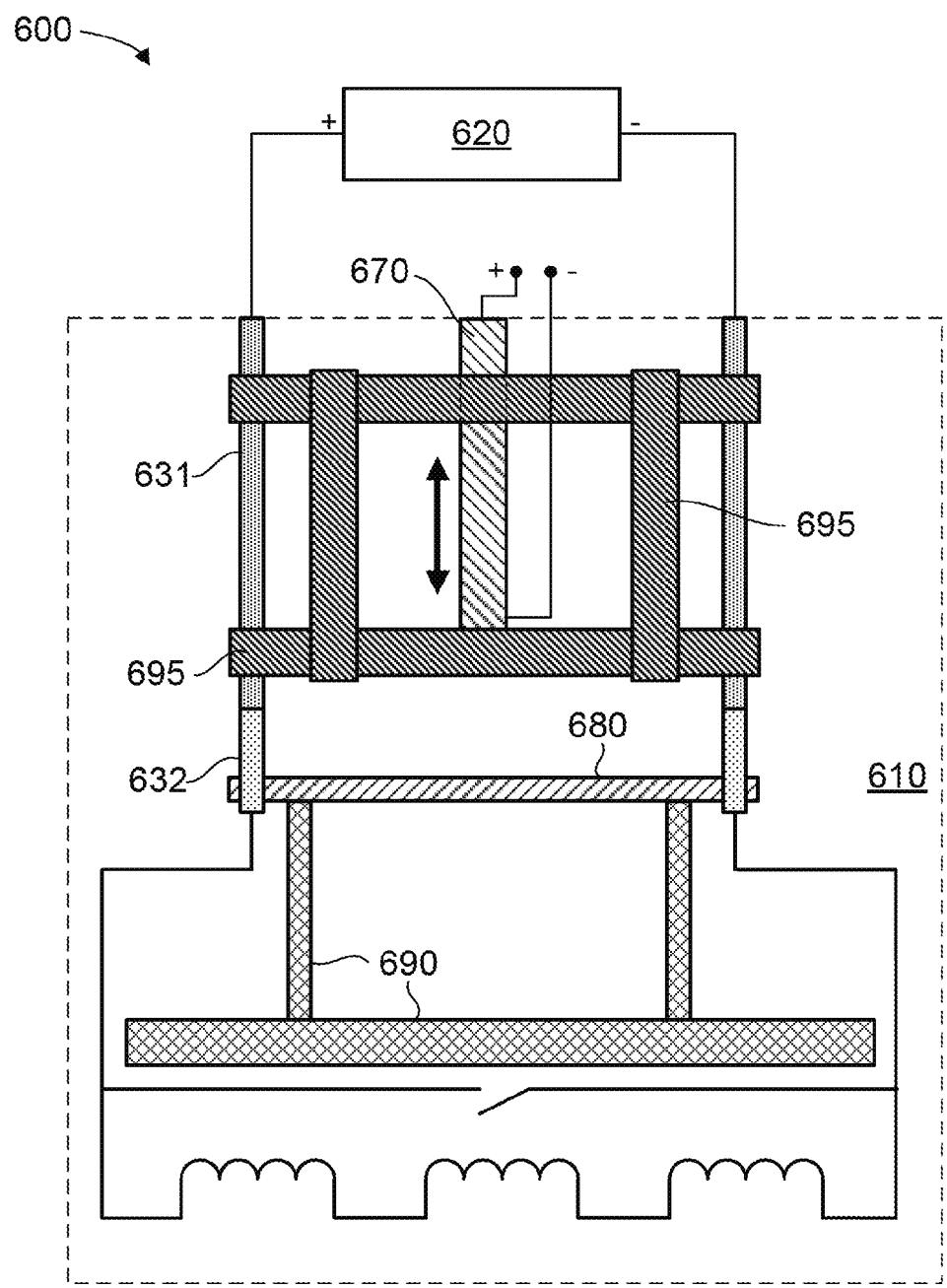
FIG. 6 illustrates a schematic diagram of a superconducting magnet apparatus where a linear displacement device is mounted to a carriage and enclosed within a vacuum container, according to an aspect of the disclosure.

FIG. 6 illustrates a schematic diagram of a superconducting magnet apparatus 600 where a linear displacement device 670 is mounted to and enclosed within a cryo-cooled, vacuum container 610, according to an aspect of the disclosure. A lead has two sections 631 and 632, and these are located on a negative and positive side of a circuit. Lead sections 632 are fixed (or stationary) as they are rigidly connected to electrically insulating, rigid member 680, which is mounted onto thermal shield 690. A carriage 695 is connected to the linear displacement device 670 at one end thereof (e.g., at the bottom of the linear displacement device), The upper horizontal piece of the carriage 695 includes a hole or aperture through which the linear displacement device passes. The side end sections of the horizontal members are rigidly attached to lead section 631. For example, each lead 631 is attached to carriage 695 in two places. In use, as the linear displacement device 670 shrinks in length, the lower horizontal piece is pulled upwards, as well as the leads 631, and conversely as the linear displacement device 670 extends in length, the lower horizontal piece is pushed downwards with leads 631 until leads 631 contact leads 632, as shown.

Figure 7:
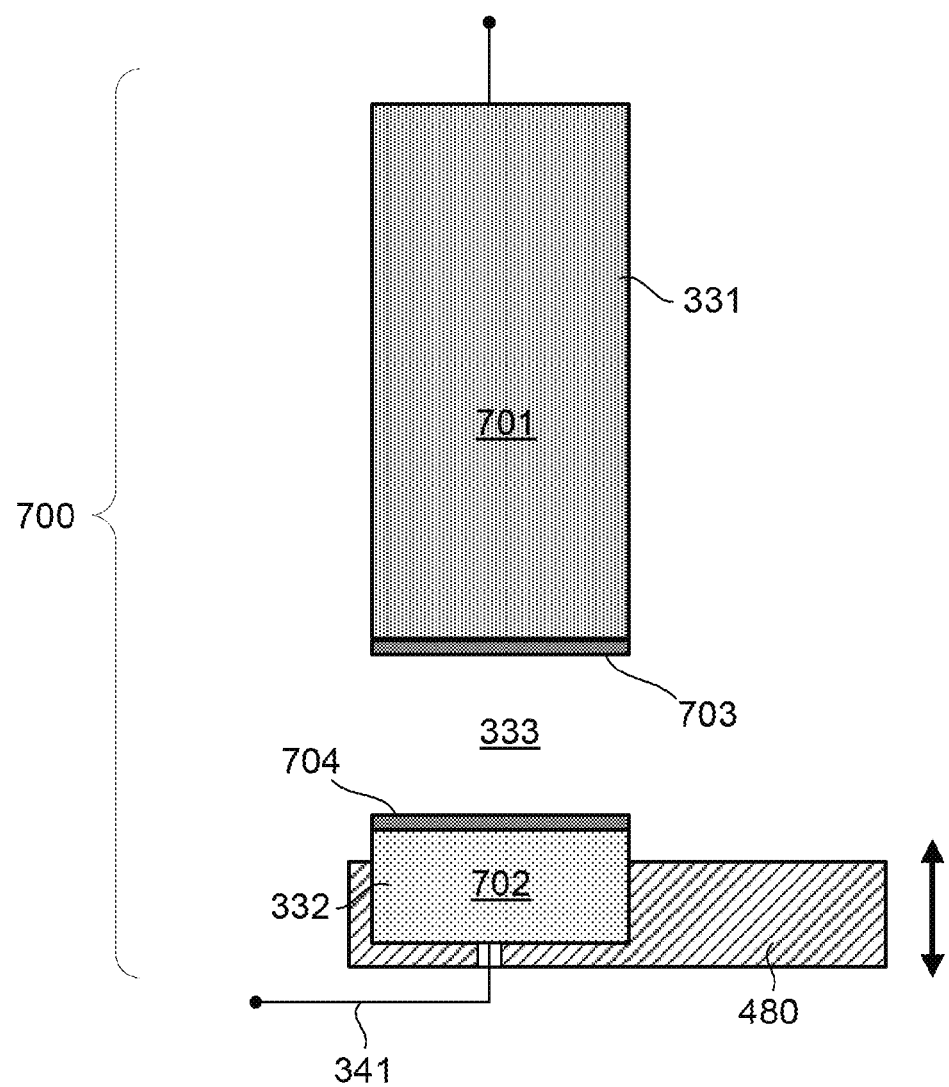
FIG. 7 illustrates a schematic and side view of a portion of the second lead of a switch, according to an aspect of the disclosure.

FIG. 7 illustrates a schematic and side view of a section of second lead 700 of the switch 330, according to an aspect of the disclosure. The first section 331 of the second lead 700 may be formed of a highly conductive main body 701, and the second section 332 of the second lead may also be formed of a highly conductive main body 702. For example, the main bodies 701, 702 may be formed of copper. Each main body contains a gold-plated surface 703, 704. Copper is preferred for the main bodies 701, 702 as it is less expensive than gold. However, gold has a much higher corrosion resistance, and therefore is a preferred material for contact surfaces 703, 704 as these two surfaces will repeatedly contact each other during operation of the apparatus 300. The second section may be mechanically or adhesively fastened to the electrically insulating rigid member 480.

Figure 8:
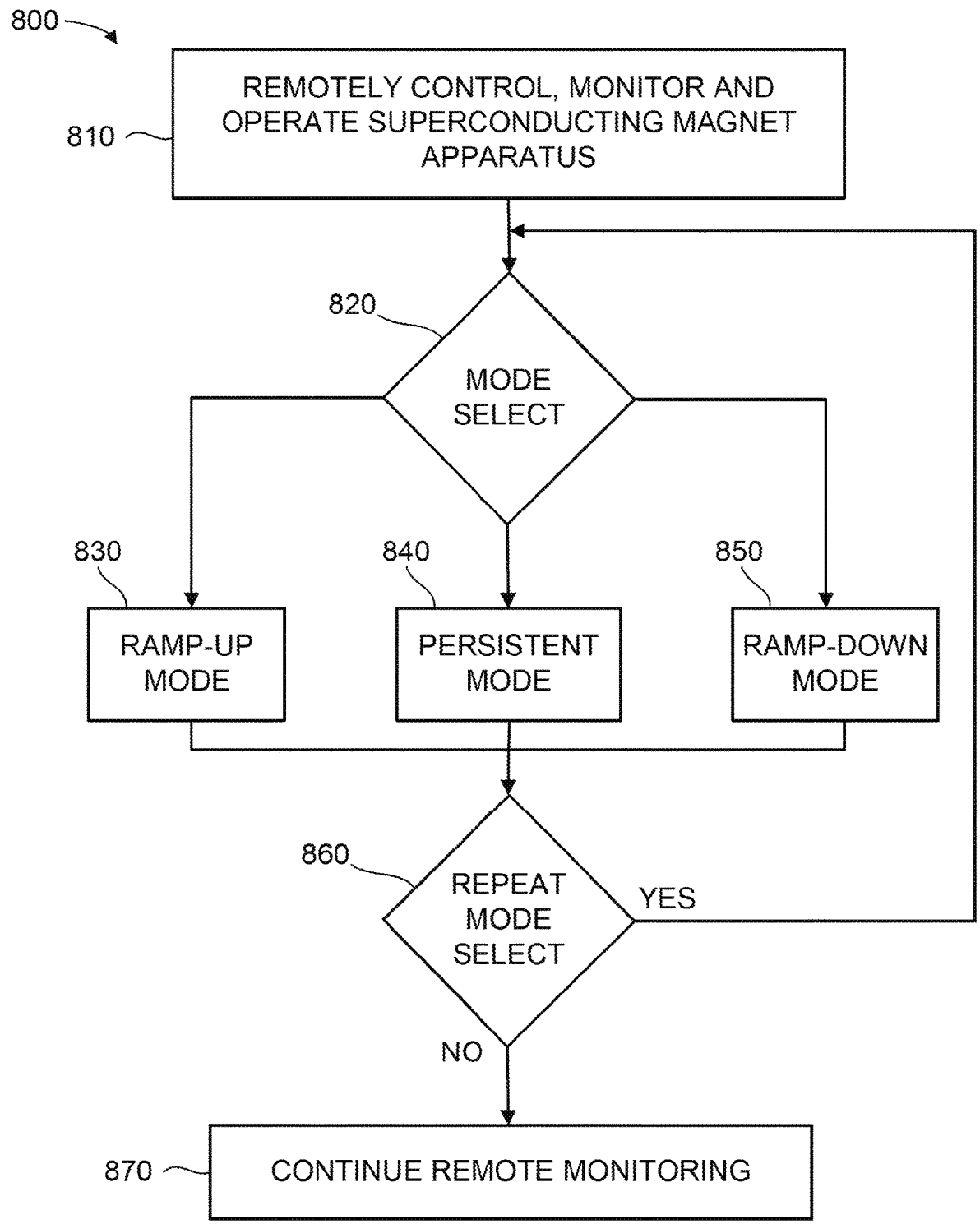
FIG. 8 illustrates a method of operating a superconducting magnet apparatus or a wind turbine including a superconducting magnet apparatus, according to an aspect of the disclosure.

FIG. 8 illustrates a method 800 of operating a superconducting magnet apparatus 300 or a wind turbine 100 including a superconducting magnet apparatus. As described above, the wind turbine includes a tower, a nacelle coupled to the tower, a rotor having one or more blades, and where the rotor is coupled to the nacelle. The superconducting magnet apparatus 300 is housed within the nacelle, and includes a plurality of superconducting magnet coils connected in series and housed within a cryogenically cooled, vacuum container. The method 800 includes a remote control, monitor or operating step 810 where a remotely located monitoring center 160 monitors the superconducting magnet apparatus 300. The monitoring center 160 communicates to the superconducting magnet control system 158 and/or turbine control system 150 in the wind turbine or machine via a wired or wireless communication link. Based on the monitoring results the remote monitoring center may issue commands to control and/or operate the superconducting magnet apparatus 300. For example, the superconducting magnet apparatus 300 may be commanded to function in multiple modes in a mode select step 820. In step 830 a ramp-up mode is performed. In this mode a power supply 320 is connected to the superconducting magnet coils 301, 302, 303. In step 840, a persistent mode is performed, and this disconnects the power supply 320 from the coils 301-303. In step 850, a ramp-down mode is performed, and in this mode a dump resistor 323 is connected to coils 301-303. In step 860, a decision is made to repeat step 820 (and subsequent steps) or to continue remote operating in step 870 (which is effectively the same as original step 810).

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A superconducting magnet apparatus comprising:
    a plurality of superconducting magnet coil sections connected in series and housed within a cryogenically cooled, vacuum container;
    a power source configured to generate a current;
    a first lead electrically connected to the plurality of superconducting magnet coil sections;
    a second lead enclosed entirely within the vacuum container, the second lead having a first section and a second section, the first section is electrically connected to the power source, the second section is electrically connected to the first lead, the second section is rigidly connected to a linear displacement device enclosed entirely within the vacuum container;
    wherein the linear displacement device is configured to linearly displace the second section relative to the first section, so that the first section contacts the second section thereby electrically connecting the first section and the second section, or by creating a gap between the first section and the second section thereby electrically disconnecting the first section from the second section; and
    wherein the second section is rigidly connected to the linear displacement device by an electrically insulating rigid member having thermal resistance.

2. The superconducting magnet apparatus of claim 1, the linear displacement device comprising:
    a piezoelectric linear displacement device or a pneumatic linear displacement device.

3. The superconducting magnet apparatus of claim 1, wherein the linear displacement device is mounted to:
    the vacuum container, or a thermal shield enclosed within the vacuum container.

4. The superconducting magnet apparatus of claim 1, the plurality of superconducting magnet coil sections electrically connected to a plurality of series connected switches, and wherein each of the plurality of series connected switches are connected in parallel to one of the plurality of superconducting magnet coil sections.

5. The superconducting magnet apparatus of claim 3, wherein the linear displacement device is controlled by a remote signal to selectively connect or disconnect the first section and the second section; and
    wherein a ramp mode of operation is applied to the plurality of superconducting magnet coil sections when the first section contacts the second section, and a persistent mode of operation of the plurality of superconducting magnet coil sections is enabled when the first section is disconnected from the second section.

6. The superconducting magnet apparatus of claim 5, wherein the plurality of superconducting magnet coil sections are electrically connected to a dump resistor located external to the vacuum container during a ramp-down mode.

7. A wind turbine comprising:
    a tower;
    a nacelle coupled to the tower;
    a rotor comprising one or more blades, the rotor coupled to the nacelle; and
    the superconducting magnet apparatus according to claim 1 housed within the nacelle, the superconducting magnet apparatus configured as a superconducting generator.

8. The wind turbine of claim 7, the linear displacement device comprising:
    a piezoelectric linear displacement device or a pneumatic linear displacement device.

9. The wind turbine of claim 7, wherein the linear displacement device is mounted to:
the vacuum container, or a thermal shield enclosed within the vacuum container.

10. The wind turbine of claim 7, the plurality of superconducting magnet coil sections electrically connected to a plurality of series connected switches, and wherein each of the plurality of series connected switches are connected in parallel to one of the plurality of superconducting magnet coil sections.

11. The wind turbine of claim 7, wherein the linear displacement device is controlled by a remote signal to selectively connect or disconnect the first section and the second section; and
wherein a ramp mode of operation is applied to the plurality of superconducting magnet coil sections when the first section contacts the second section, and a persistent mode of operation of the plurality of superconducting magnet coil sections is enabled when the first section is disconnected from the second section.

12. The wind turbine of claim 11, wherein the plurality of superconducting magnet coil sections are electrically connected to a dump resistor located external to the vacuum container during a ramp-down mode.

* * * * *